United States Patent
Vallamkondu et al.

(10) Patent No.: US 12,436,166 B2
(45) Date of Patent: Oct. 7, 2025

(54) FLOW ANGLE SENSOR WITH IMAGE SENSOR

(71) Applicant: Rosemount Aerospace Inc., Burnsville, MN (US)

(72) Inventors: Aswin Kumar Vallamkondu, Banglore (IN); Kent Allan Ramthun, Shakopee, MN (US); Naveen Kumar Devarakonda, Bangalore (IN); Jeremy S. Burns, Farmington, MN (US); Alexander N. Reid, St. Louis Park, MN (US); Karthik Jegatheeswaran, Bangalore (IN); Venkata Sai Sudheer Kumar Vennelakanti, Bengaluru (IN)

(73) Assignee: Rosemount Aerospace Inc., Burnsville, MN (US)

( * ) Notice: Subject to any disclaimer, the term of this patent is extended or adjusted under 35 U.S.C. 154(b) by 134 days.

(21) Appl. No.: 17/979,335

(22) Filed: Nov. 2, 2022

(65) Prior Publication Data

US 2023/0168270 A1 Jun. 1, 2023

(30) Foreign Application Priority Data

Nov. 30, 2021 (IN) .............. 202141055481

(51) Int. Cl.
  *G01P 13/02* (2006.01)
  *B64D 47/00* (2006.01)
  *G01P 1/02* (2006.01)

(52) U.S. Cl.
  CPC ............ *G01P 13/025* (2013.01); *B64D 47/00* (2013.01); *G01P 1/02* (2013.01)

(58) Field of Classification Search
  CPC .......... B64D 43/02; B64D 47/00; G01D 5/26; G01P 1/02; G01P 13/025
  See application file for complete search history.

(56) References Cited

U.S. PATENT DOCUMENTS

| | | | |
|---|---|---|---|
| 2,872,809 A | 2/1959 | Yavne | |
| 4,560,925 A * | 12/1985 | Niven | ................ H02K 41/0358 |
| 6,342,846 B1 | 1/2002 | Argentieri | |
| 11,629,975 B2 * | 4/2023 | Leon | .................... G01C 23/005 |
| | | | 701/40 |
| 2003/0041465 A1 | 3/2003 | Brusius | |
| 2011/0103933 A1* | 5/2011 | Olesen | ................... F03D 17/00 |
| | | | 415/118 |

(Continued)

FOREIGN PATENT DOCUMENTS

JP 5453130 B2 3/2014

OTHER PUBLICATIONS

Extended European Search Report for European Patent Application No. 22209407.0, dated Apr. 18, 2023, 11 pages.

*Primary Examiner* — Tri T Ton
(74) *Attorney, Agent, or Firm* — Kinney & Lange, P.A.

(57) ABSTRACT

A flow angle sensor includes a sensing element, a background component connected to and movable with the sensing element, the background component having a marker, a lens adjacent the disk, an image sensor axially aligned with the lens, a light source positioned to illuminate the disk, and an image processing system connected to the image sensor. The image processing system provides an angle of attack output based on a location of the marker sensed by the image sensor.

11 Claims, 7 Drawing Sheets

(56) References Cited

U.S. PATENT DOCUMENTS

| | | | |
|---|---|---|---|
| 2013/0333462 A1* | 12/2013 | Argentieri | G01P 13/025 73/170.05 |
| 2014/0230539 A1* | 8/2014 | Perju | G01P 13/025 73/180 |
| 2018/0136249 A1 | 5/2018 | Krueger et al. | |

* cited by examiner

FLOW ANGLE SENSOR WITH IMAGE SENSOR

BACKGROUND

The present disclosure relates to sensors, and in particular, to flow angle sensors.

Flow angle sensors, such as angle of attack sensors or side slip angle sensors, are installed on aircraft to generate air data parameters. Angle of attack sensors with rotatable vanes are installed on the exterior of an aircraft to measure the aircraft angle of attack, the angle between oncoming airflow and the aircraft zero line (a reference line of the aircraft, such as a chord of a wing of the aircraft). The angle of attack sensor is mounted to the aircraft such that the rotatable vane protrudes outside the aircraft and is exposed to oncoming airflow. Aerodynamic forces acting on the rotatable vane cause the vane to align with the direction of the oncoming airflow. Rotational position of the vane is sensed and used to determine the aircraft angle of attack. It can be difficult to measure the angle of attack under certain conditions.

SUMMARY

A flow angle sensor includes a sensing element, a background component connected to and movable with the sensing element, the background component having a marker, a lens adjacent the disk, an image sensor axially aligned with the lens, a light source positioned to illuminate the disk, and an image processing system connected to the image sensor. The image processing system provides an angle of attack output based on a location of the marker sensed by the image sensor.

An angle of attack sensor includes a housing, a faceplate positioned on the housing, a vane assembly adjacent the faceplate, the vane assembly including a vane connected to a vane shaft, a rotatable disk connected to the vane shaft opposite the vane, the disk having a marker, a lens adjacent the disk, an image sensor axially aligned with the lens, a light source within the housing and positioned to illuminate the disk, and an image processing system connected to the image sensor.

DETAILED DESCRIPTION

In general, the present disclosure describes an angle of attack sensor that has an image sensor connected to an image processing system to measure angle of attack using optical sensing technology. The image sensor determines the locations of a marker on a rotating disk connected to a rotating vane by continuously capturing images of the marker using a lens and a light source. The image processing system uses the locations of the marker to determine the angular displacement of the vane and subsequently the local flow angle.

Figure 1:
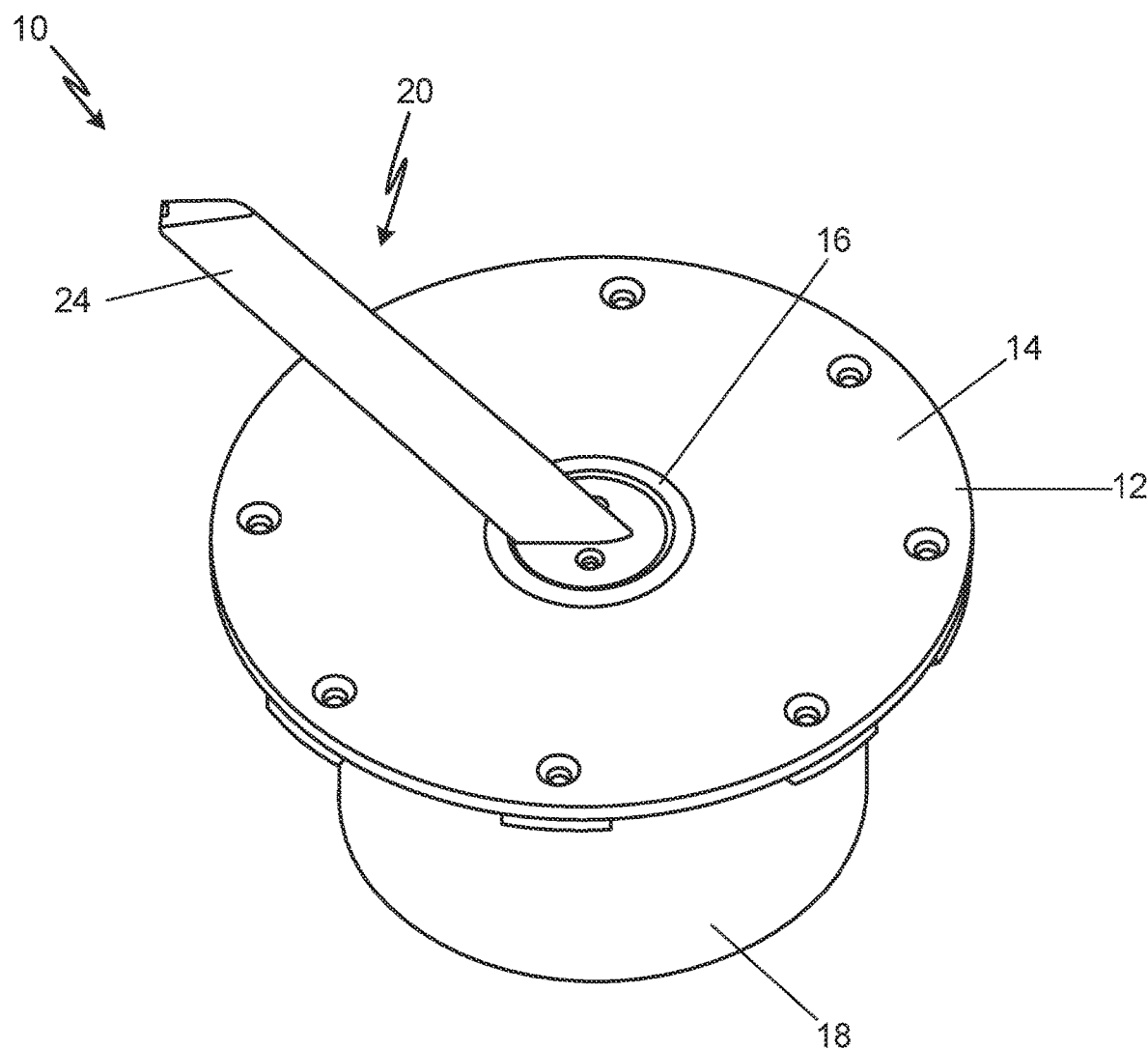
FIG. 1 is a perspective view of an angle of attack sensor.

FIG. 1 is a perspective view of angle of attack sensor 10. Angle of attack sensor 10 includes faceplate 12 (which includes mounting plate 14 and chassis 16), housing 18, and vane assembly 20 (which includes vane 24).

Angle of attack sensor 10 is a flow angle sensor. Faceplate 12 is a multi-piece faceplate that includes mounting plate 14 and chassis 16. Mounting plate 14 has an opening at a center of mounting plate 14. Chassis 16 is adjacent mounting plate 14 and may be heated. Mounting plate 14 is positioned on chassis 16 such that chassis 16 is located inward from or interior to mounting plate 14 with respect to housing 18. In alternate embodiments, faceplate may be a single-piece faceplate that does not include chassis 16. Housing 18 is cylindrical with an annular sidewall between an open first end and a closed second end. In alternate embodiments, housing 18 may be any suitable shape. Faceplate 12 is positioned on housing 18 adjacent to the open first end of housing 18. Mounting plate 14 is an outer piece of faceplate 12, and chassis 16 is an inner piece of faceplate 12. Vane assembly 20 is adjacent faceplate 12. Vane assembly 20, which includes vane 24, has a portion that is positioned in chassis 16 and extends through the opening of mounting plate 14. Vane 24 extends through mounting plate 14.

Angle of attack sensors 10 are installed on an aircraft and mounted to the aircraft via fasteners, such as screws or bolts, and mounting holes on mounting plate 14. As a result, mounting plate 14 is about flush with the skin of the aircraft and housing 18 extends within an interior of the aircraft. Vane 24 extends outside an exterior of aircraft and is exposed to external airflow, causing vane 24 to rotate with respect to mounting plate 14 and chassis 16 via a series of bearings within angle of attack sensor 10. Vane 24 rotates based on the local flow angle. Vane 24 causes rotation of a vane shaft, and a disk within housing 18. Rotation of the rotatable vane is determined and used to measure the angle of attack. The measured angle of attack is communicated to a flight computer or other aircraft systems, such as avionics, air data inertial reference units (ADIRUs), flight control computers, or air data computers, and can be used to generate air data parameters related to the aircraft flight condition.

Figure 2:
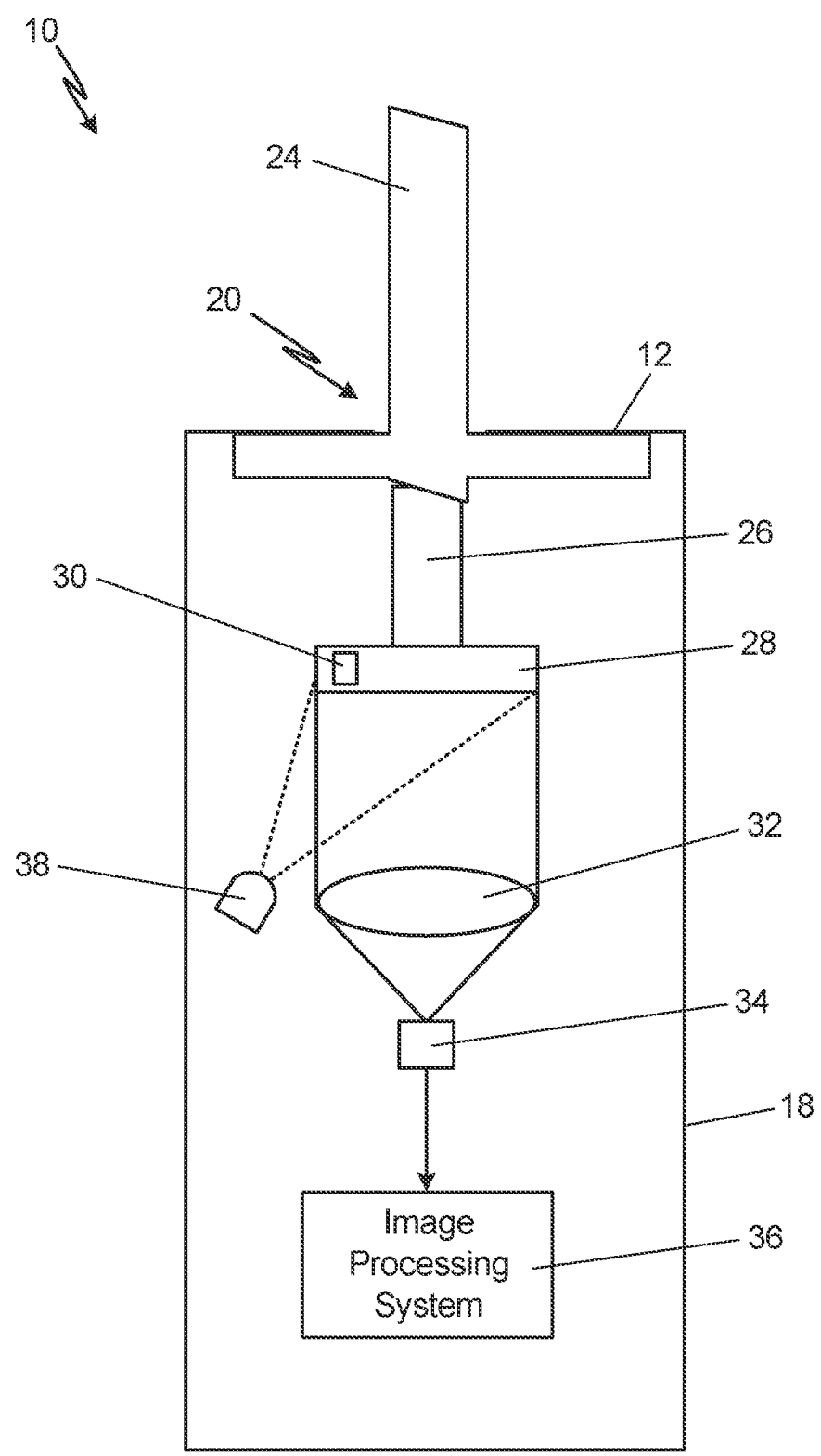
FIG. 2 is a schematic view of the angle of attack sensor.
Figure 3A:
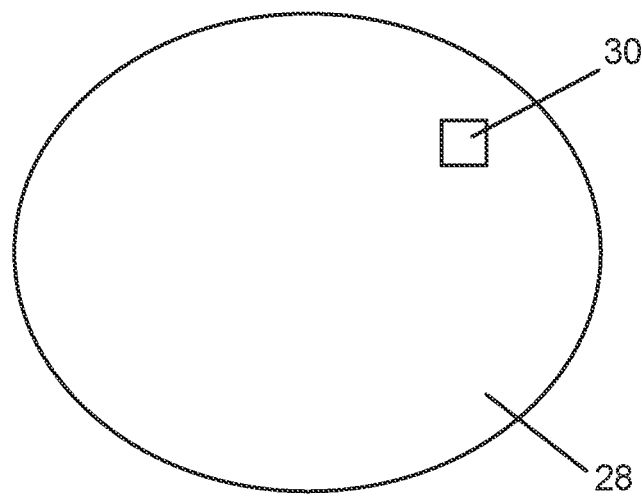
FIG. 3A is a schematic top view of a disk showing a marker.
Figure 3B:
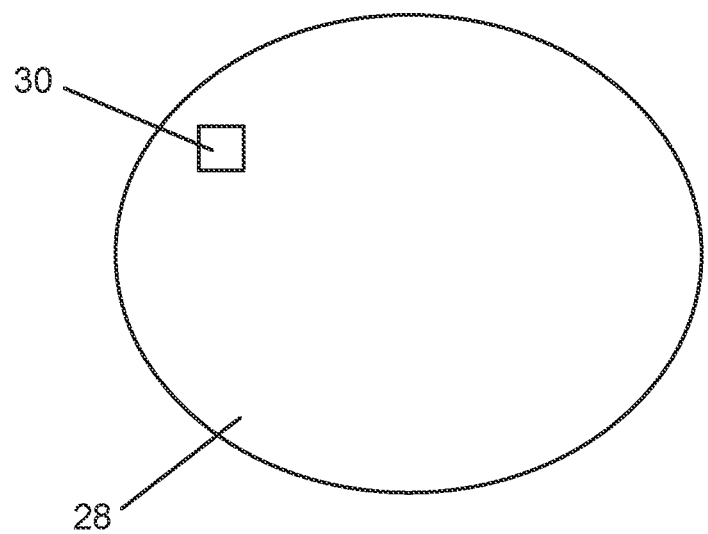
FIG. 3B is a schematic top view of the disk showing the marker after the disk has been rotated.
Figure 4:
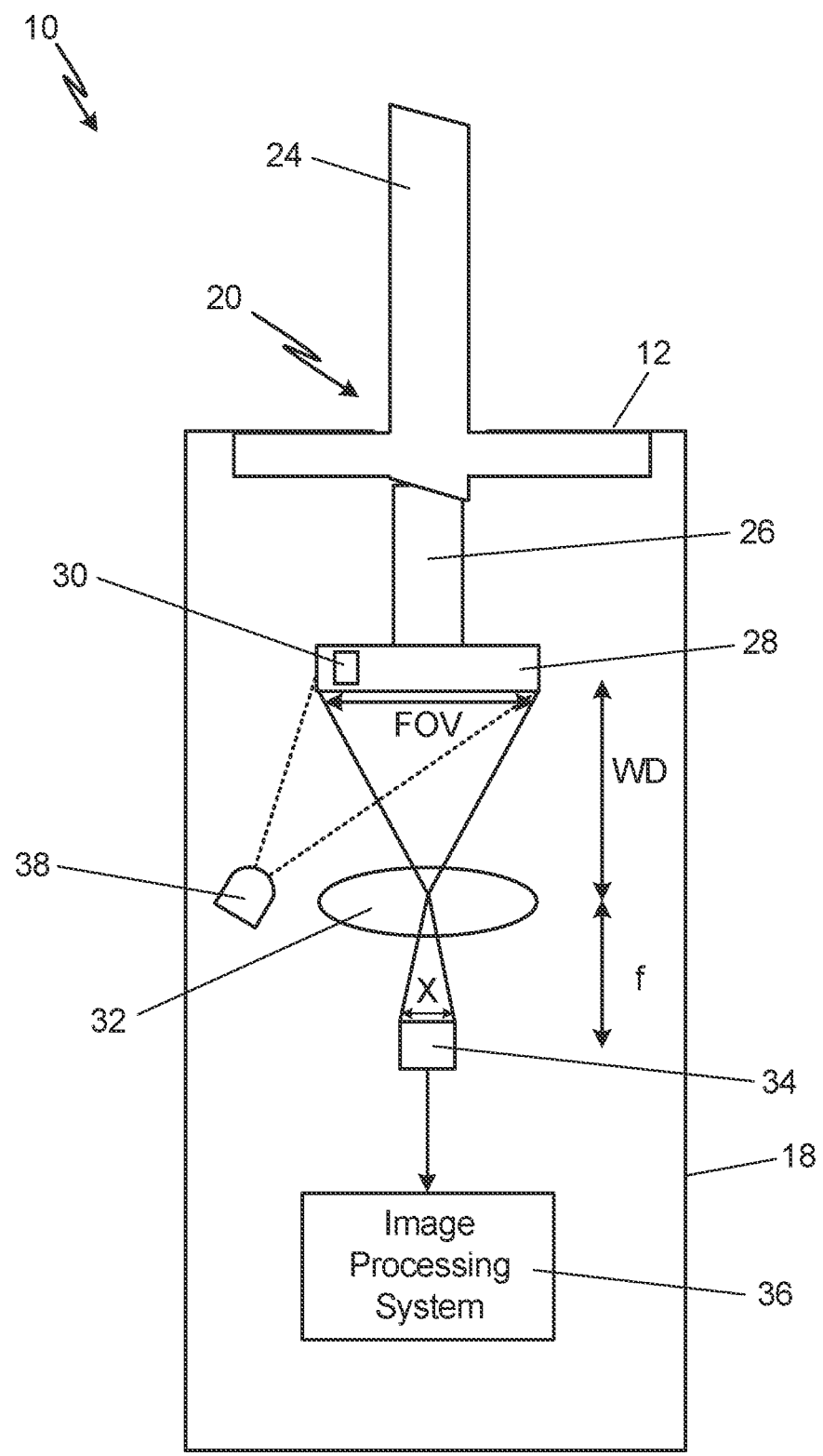
FIG. 4 is a schematic view of the angle of attack sensor showing variables used for calculating angle of attack.
Figure 5:
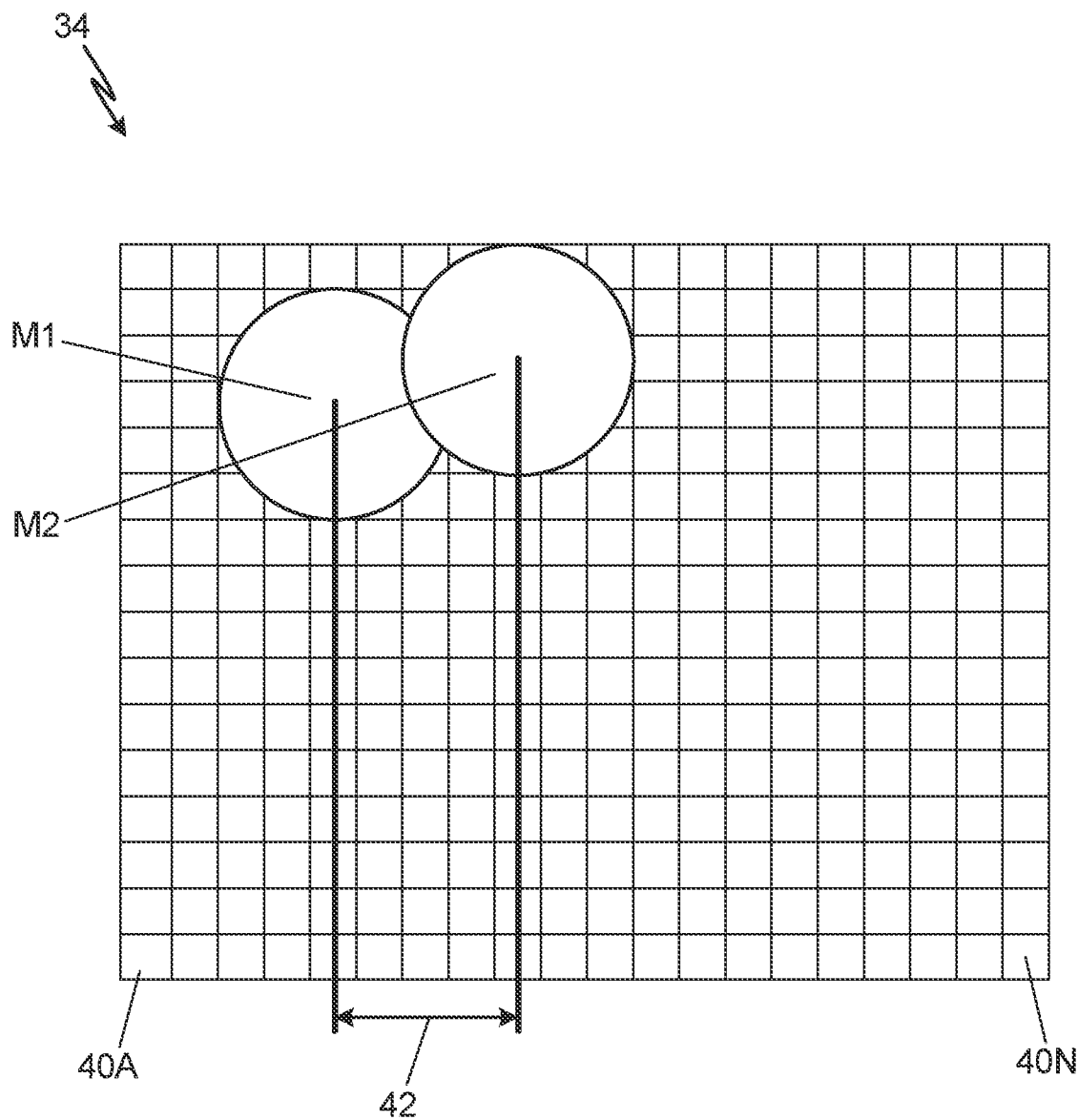
FIG. 5 is a schematic view showing movement of the marker along pixels of an image sensor.
Figure 6:
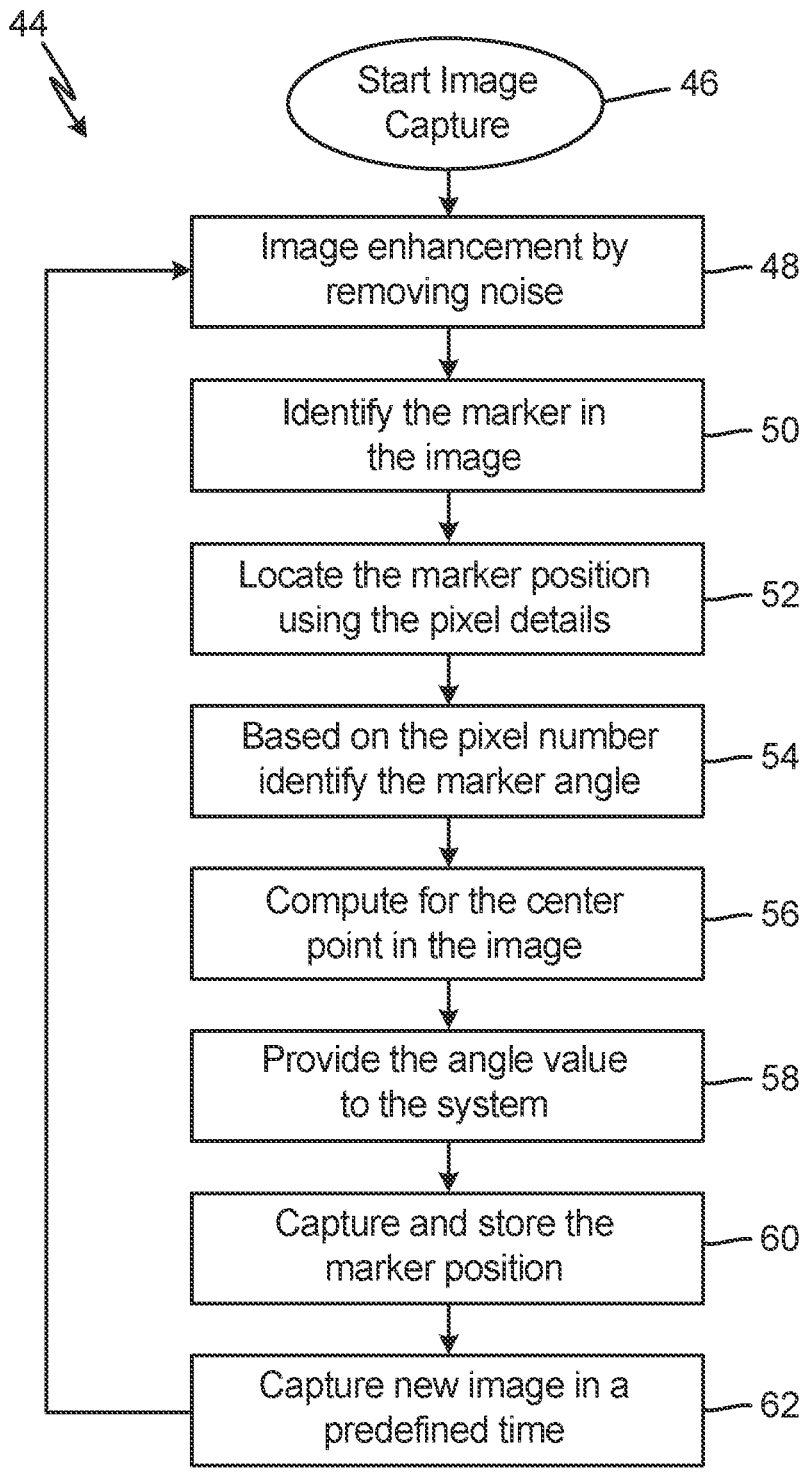
FIG. 6 is a flowchart showing a method for image processing.

FIG. 2 is a schematic view of angle of attack sensor 10. FIG. 3A is a schematic top view of disk 28 showing marker 30. FIG. 3B is a schematic top view of disk 28 showing marker 30 after disk 28 has been rotated. FIG. 4 is a schematic view of angle of attack sensor 10 showing variables used for calculating angle of attack. FIG. 5 is a schematic view showing movement of marker 30 along pixels 40 of image sensor 34. FIG. 6 is a flowchart showing method 44 for image processing. FIGS. 2-6 will be discussed together. Angle of attack sensor 10 includes faceplate 12, housing 18, vane assembly 20 (which includes vane 24), vane shaft 26, disk 28, marker 30, lens 32, image sensor 34, image processing system 36, and light source 38. Image sensor 34 includes pixels 40A-40N ("N" is used herein as an arbitrary integer), first marker location M1, second marker location M2, and pitch 42. Method 44 (shown in FIG. 6) includes step 46, step 48, step 50, step 52, step 54, step 56, step 58, step 60, and step 62.

Faceplate 12 is positioned on housing 18. Vane assembly 20, which includes vane 24, extends through faceplate 12. Vane 24 projects into the airstream that is aligned with the external airflow. Vane 24 is a sensing element. An end of vane 24 may be positioned in an opening of faceplate 12. Vane 24 is connected to a first end of vane shaft 26. Vane shaft 26 extends into housing 18. A second end of vane shaft 26 is internally connected to rotating cylindrical disk 28. As such, vane 24 is connected to disk 28 via vane shaft 26. Vane 24, vane shaft 26, and disk 28 move, or rotate, together. Disk 28 is a background component for marker 30. Marker 30 is positioned in disk 28. Marker 30 may be a dot or any other suitable shape. Marker is in a fixed position within disk 28. As shown in FIGS. 3A and 3B, as disk 28 rotates, the location of marker 30 changes. Lens 32 is adjacent disk 28. Lens 32 is a converging lens. Image sensor 34 is also placed along an axis of vane shaft 26 and is axially aligned with disk 28 and lens 32. Image sensor 34 is a complementary metal-oxide-semiconductor (CMOS) based image sensor. In alternate embodiments, image sensor 34 may be any other suitable image sensor chip or image sensor. Image processing system 36 is connected to image sensor 34. Image processing system 36 may be electrically or wirelessly connected to image sensor 34. Light source 38 is within housing 18 and positioned to illuminate disk 28 for proper detection by image sensor 34.

As seen in FIG. 4, field of view FOV is equal to the diameter of disk 28. In alternate embodiments, field of view FOV may be greater than or less than the diameter of disk 28 depending on desired resolution. Length X is the diagonal length of image sensor 34. Focal length f of lens 32 is the distance between lens 32 and image sensor 34. Working distance WD is the distance between disk 28 and lens 32. Focal length f and working distance WD determine the magnification for image processing system 36. Focal length f divided by working distance WD is equal to length X divided by field of view FOV (f/WD=X/FOV). As such, field of view FOV, length X of image sensor 34, focal length f, and working distance WD are variables used by image processing system 36 in calculating angle of attack.

As seen in FIG. 5, image sensor 34 includes pixels 40A-40N. Image sensor 34 has a two-dimensional fixed array of pixels 40A-40N. FIG. 5 shows pixels 40A-40N. In alternate embodiments, image sensor 34 may include any number of pixels. Pixels 40A-40N relate to the resolution of image sensor 34. First marker location M1 designates a first location of marker 30 determined from a first image of marker 30 within image sensor 34. First marker location M1 corresponds to a first location of disk 28 and vane 24. Second marker location M2 designates a second location of marker 30 determined from a second image of marker 30 within image sensor 34. Second marker location M2 corresponds to a second location of disk 28 and vane 24. As marker 30 moves, images of marker 30 move among pixels 40A-40N. Pitch 42 is the distance between first marker location M1 and second marker location M2, or the distance between pixels 40A-40N corresponding to first marker location M1 and second marker location M2, on image sensor 34. As marker 30 rotates, it moves along an arc on image sensor 34 to determine rotation of vane 24, resulting in movement in, or a change in position within, pixels 40 in both horizontal and vertical (or x-axis and y-axis) directions.

Disk 28 captures movement of vane 24. As vane 24 rotates, vane shaft 26 and disk 28 rotate. Marker 30 is utilized for angle indication. Light source 38 illuminates disk 28 so that image sensor 34 can capture marker 30 in disk 28 with the use of lens 32. Image sensor 34 captures the position of marker 30. Image sensor 34 continuously senses the position of marker 30 in disk 28 and transmits marker 30 position information to image processing system 36. The location of marker 30 is used to determine if and where marker 30 is moving within image sensor 34 to measure angular displacement of vane 24. As such, angle of attack sensor 10 uses image processing system 36 to capture the movement of disk 28 by calculating the angular movement of marker 30, which is directly proportional to the angle of vane 24, based on tracking the position of marker 30 on images captured by image sensor 34 and calculating pitch 42. Image processing system 36 uses the positions and number of pixels 40A-40N occupied by marker 30 to calculate an angle of attack via an image processing algorithm.

For example, vane 24 begins in an initial position of zero degrees. When vane 24 is at zero degrees, an image of marker 30 is captured, and the location of marker 30 corresponds to first marker location M1. As such, first marker location M1 corresponds to a zero angle or default position. As vane 24 rotates, the movement of circular disk 28 causes the location of marker 30 to change from its default position. Image sensor 34 captures a new image of marker 30 in a new location, which corresponds to second marker location M2. The change in position of marker 30, identified using second marker location M2 and the default position, or first marker location M1, is equal to pitch 42, which is used to compute an angle via digital processing techniques. First marker location M1 and second marker location M2 may correspond to any two positions of vane 24. First marker location M1 and second marker location M2 information is transmitted to image processing system 36, which uses an image processing algorithm that correlates the marker locations M1, M2 to an aircraft angle of attack. For example, motion of marker 30 can be determined by the percentage of pixels 40 the image of marker 30 has moved across. As such, image processing system 36 provides an angle of attack output based on a location of marker 30 sensed by image sensor 34.

FIG. 6 shows method 44 for image processing by image processing system 36. Step 46 includes starting image capture. Image sensor 34 captures an image of marker 30 on disk 28. Step 48 includes image enhancement by removing noise. Image processing system 36 receives the image captured by image sensor 34. Image processing system 36 removes noise, thereby enhancing the image. Step 50 includes identifying marker 30 in the captured image. Image processing system 36 identifies marker 30 on the enhanced image. Step 52 includes locating marker 30 position using details of pixels 40A-40N. Image processing system 36 locates the position of marker 30 on the image. Step 54 includes identifying the angle of marker 30 based on the pixel number. Image processing system 36 uses pixels 40A-40N to identify the angle of marker 30 by identifying in which of pixels 40A-40N image is located. Step 56 includes computing the center point in the image. Image processing system 36 determines the center point in the image of marker 30, generating first marker location M1. Step 58 includes providing the angle value to image processing system 36. Image sensor 34 transmits information corresponding to the pixel 40 in which the center point of the image of marker 30 is located to image processing system 36. Step 60 includes capturing and storing the position of marker 30. Image processing system 36 receives location information from image sensor 34 and stores such information. Step 62 includes capturing a new image in a predefined time. Image sensor 34 captures a new image of marker 30 after a set amount of time to determine whether marker 30 has moved. The new position of marker 30 correlates to the angle at which vane 24 has moved. Method 44 is continuously repeated, with image sensor 34 constantly capturing images to track the position of marker 30 in corresponding pixels 40 to determine corresponding movement of vane 24, which produces angle of attack.

Traditional angle of attack sensors, or other flow angle sensors, use resolvers, rotatory variable differential transformers (RVDTs), and potentiometer-based concepts for angle of attack measurement. As such, the sensor may rely on electromagnetics to measure local physical angular displacement with respect to the air stream. Accuracy of the angle of attack measurement varies with temperature, and the sensing element can cause increased friction, which is undesirable. For example, angle accuracy decreases with respect to temperature. Further, the angle is limited with RVDT and potentiometer-based systems of sensors, resulting in a limitation in measurement capabilities. The relative measurement of traditional systems is also dependent on mechanical properties of the vane shaft, such as friction, weight, and tolerance and additional gears that may be present in the system. Additional excitation is also required for the sensor, which cannot be completely isolated from the system. Excitation connections through wires to the vane shaft and resolver or potentiometer are prone to electromagnetic interference (EMI). Changes in electrical parameters, like wire inductances and resistances, cause accuracy variations. As a result, an offset error to the measured value needs to be corrected by calibration. Only relative measurement is possible, and losses will require calibration. Additionally, measured angle accuracy varies with angular displacement when using certain traditional technologies.

Because angle of attack sensor 10 does not require contact, friction and hysteresis are reduced, resulting in an increase in reliability and accuracy of absolute angle of attack. The accuracy of angle of attack sensor 10 is less affected by temperature variations than traditional sensors because only the image is monitored. Further, angle of attack sensor 10 is immune to EMI noise as angle of attack sensor 10 uses optical image sensing and image processing to generate angle of attack measurements. Additionally, because angle of attack sensor 10 is an optical-based system that does not require contact, angle of attack sensor 10 is less prone to effects of direct and indirect lightning strike. Angle of attack sensor 10 is also capable of high-resolution encoding. Angle of attack sensor 10 achieves the same high level of accuracy as traditional systems for the complete range of angular displacement. Increased magnification is balanced against decreased focal length f to result in a reasonably-sized angle of attack sensor 10 with optimal angular resolution. As such, angle of attack sensor 10 produces angle of attack measurements that are as accurate or more accurate than traditional angle of attack sensors.

Figure 7:
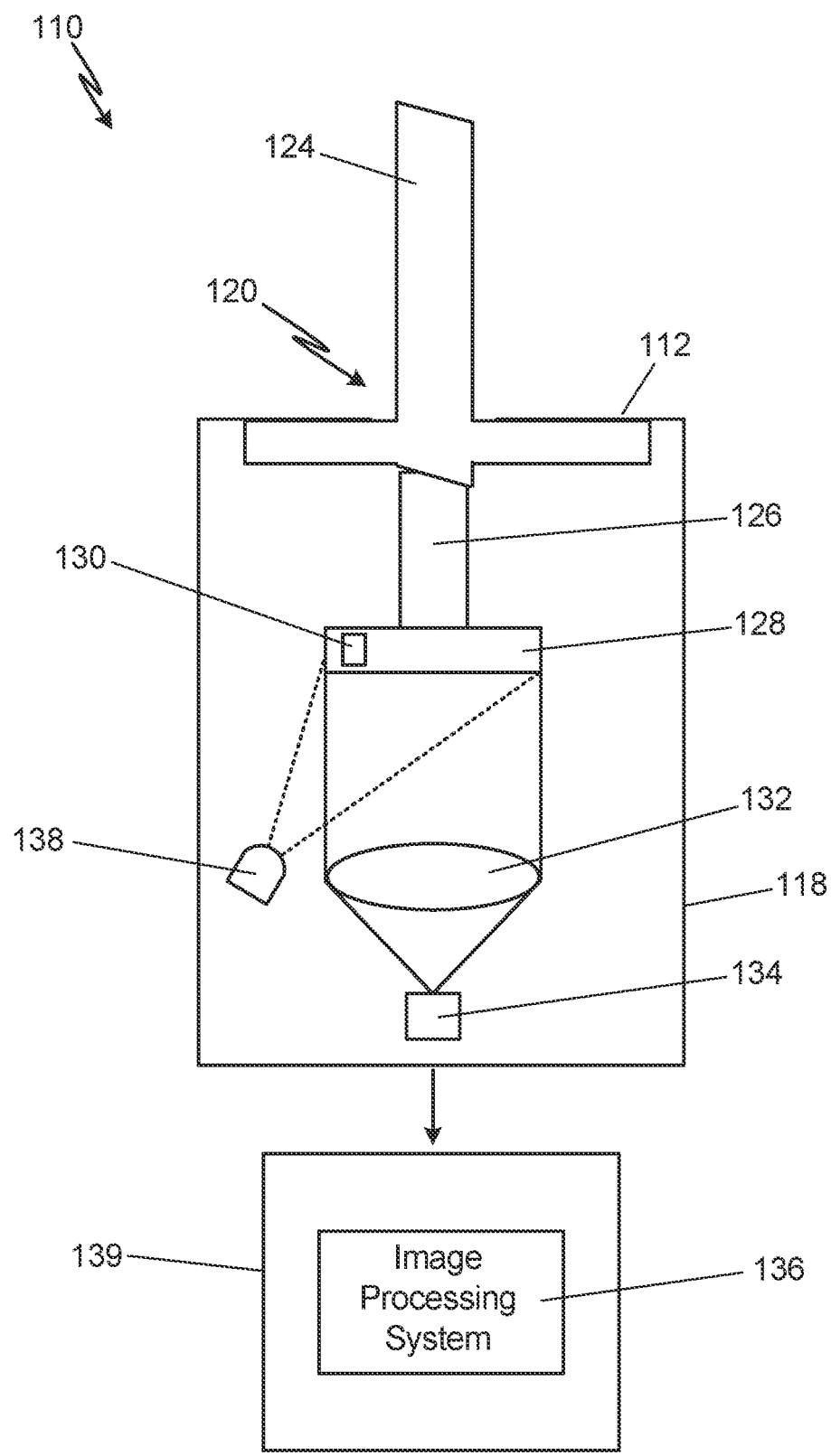
FIG. 7 is a schematic view of an alternate embodiment of the angle of attack sensor.

FIG. 7 is a schematic view of angle of attack sensor 110. Angle of attack sensor 110 includes faceplate 112, housing 118, and vane assembly 120 (which includes vane 124), vane shaft 126, disk 128, marker 130, lens 132, image sensor 134, image processing system 136, light source 138, and second location 139.

Angle of attack sensor 110 has the same structure and function as described with respect to FIGS. 1-6. However, angle of attack sensor 110 has image processing system 136 positioned in second location 139 rather than housing 118. Second location 139 is a location separate from angle of attack sensor 110. Second location 139 may be the flight controls, another remote module, or any other suitable location. Image processing system 136 in second location 139 is electrically or wirelessly connected to image sensor 134 of angle of attack sensor 110. Positioning image processing system 136 in second location 139 allows angle of attack sensor 110 to have a smaller size.

While angle of attack sensors 10 and 110 have been described with respect to rotatable vanes 24 and 124 as the sensing elements and rotatable disks 28 and 128 as background components, angle of attack sensors with various types of sensing elements influenced by airflow external to the aircraft and various background components, including those that move side-to-side or up-and-down, (such as a flipper or cone-based system) can use image sensors (such as image sensors 34 and 134), lenses (such as lenses 32 and 132), light sources (such as light sources 38 and 138), and image processing systems (such as image processing systems 36 and 136) to measure angle of attack via optical sensing technology. Additionally, while such technology has been described with respect to angle of attack sensor 10 and 110, it may also be used on other types of flow angle sensors, such as a side slip sensor.

Discussion of Possible Embodiments

The following are non-exclusive descriptions of possible embodiments of the present invention.

A flow angle sensor includes a sensing element; a background component connected to and movable with the sensing element, the background component having a marker; a lens adjacent the background component; an image sensor axially aligned with the lens; a light source positioned to illuminate the background component; and an image processing system connected to the image sensor, wherein the image processing system provides an angle of attack output based on a location of the marker sensed by the image sensor.

The flow angle sensor of the preceding paragraph can optionally include, additionally and/or alternatively, any one or more of the following features, configurations and/or additional components:

The lens is a converging lens.

The image sensor is a CMOS based image sensor.

The flow angle sensor is an angle of attack sensor and the sensing element is a vane of the angle of attack sensor.

The background component is a rotatable disk.

The vane is connected to the disk via a vane shaft connected to the vane and the disk.

The distance between the lens and the image sensor divided by the distance between the disk and the lens is equal to the length of the image sensor divided by the field of view.

The image processing system is wirelessly connected to the image sensor.

The image sensor includes a two-dimensional fixed array of pixels.

The image sensor captures images of the marker to determine a first location and a second location of the marker as a distance between pixels corresponding to the first location and the second location of the marker.

An angle of attack sensor includes a housing; a faceplate positioned on the housing; a vane assembly adjacent the faceplate, the vane assembly including a vane; a vane shaft connected to the vane; a rotatable disk connected to the vane shaft opposite the vane, the disk having a marker; a lens adjacent the disk; an image sensor axially aligned with the lens; a light source within the housing and positioned to illuminate the disk; and an image processing system connected to the image sensor.

The angle of attack sensor of the preceding paragraph can optionally include, additionally and/or alternatively, any one or more of the following features, configurations and/or additional components:

The faceplate is a multi-piece faceplate including: a mounting plate having an opening; and a chassis positioned adjacent the mounting plate and located inward from the mounting plate with respect to the housing.

The lens is a converging lens.

The image sensor is a CMOS based image sensor.

The image processing system is wirelessly connected to the image sensor.

The image processing system is electrically connected to the image sensor.

The vane shaft, the rotating disk, the lens, the light source, and the image sensor are positioned in a first location, the first location being the housing of the angle of attack sensor, and the image processing system is positioned in a second location.

The second location is flight controls of an aircraft.

The image processing system provides an angle of attack output based on a location of the marker sensed by the image sensor.

The image sensor captures images of the marker to determine a first location and a second location of the marker and a change in position of the marker within pixels corresponding to the first location and the second location of the marker.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A flow angle sensor comprising:
   a housing;
   a faceplate positioned on the housing;
   a vane assembly adjacent to the faceplate, the vane assembly including a vane connected to a vane shaft;
   a disk connected to and rotatable with the vane shaft, wherein the disk has a marker utilized for angle indication;
   a light source within the housing and positioned to illuminate the disk such that light reflects from the disk;
   a lens positioned to receive light reflected from the disk;
   an image sensor positioned to receive light from the lens to sense a location of the marker on the disk; and
   an image processing system connected to the image sensor, wherein the image processing system provides an angle of attack output based on the location of the marker sensed by the image sensor,
   wherein a focal length of the lens is a distance between the lens and the image sensor, a working distance is a distance between the disk and the lens, and the focal length divided by the working distance is equal to a diagonal length of the image sensor divided by the field of view.

2. The flow angle sensor of claim 1, wherein the lens is a converging lens.

3. The flow angle sensor of claim 1, wherein the image sensor is a CMOS based image sensor.

4. The flow angle sensor of claim 1, wherein the flow angle sensor is an angle of attack sensor.

5. The flow angle sensor of claim 1, wherein the image processing system is wirelessly connected to the image sensor.

6. The flow angle sensor of claim 1, wherein the image sensor includes a two-dimensional fixed array of pixels.

7. The flow angle sensor of claim 6, wherein the image sensor captures images of the marker to determine a first location and a second location of the marker as a distance between pixels corresponding to the first location and the second location of the marker.

8. The flow angle sensor of claim 1, wherein the faceplate is a multi-piece faceplate including:
   a mounting plate having an opening; and
   a chassis positioned adjacent the mounting plate and located inward from the mounting plate with respect to the housing.

9. The flow angle sensor of claim 1, wherein the image processing system is electrically connected to the image sensor.

10. The flow angle sensor of claim 1, wherein the vane shaft, the rotating disk, the lens, the light source, and the image sensor are positioned in a first location, the first location being the housing of the angle of attack sensor, and the image processing system is positioned in a second location.

11. The flow angle sensor of claim 10, wherein the second location is flight controls of an aircraft.

* * * * *